United States Patent

Logan

Patent Number: 5,517,889
Date of Patent: May 21, 1996

[54] SAW BLADE

[76] Inventor: Patrick K. Logan, R.R. 2, Box 203CA, Stanley, Wis. 54768

[21] Appl. No.: 292,353

[22] Filed: Aug. 18, 1994

Related U.S. Application Data

[63] Continuation of Ser. No. 163,589, Dec. 6, 1993, abandoned, which is a continuation of Ser. No. 920,651, Jul. 28, 1992, abandoned.

[51] Int. Cl.$^6$ .................................................... B27B 19/00
[52] U.S. Cl. ............................................ 83/835; 83/746
[58] Field of Search ............................. 83/835, 697, 746; 30/355

[56] References Cited

U.S. PATENT DOCUMENTS

| | | | |
|---|---|---|---|
| 955,050 | 4/1910 | Breshahan | 30/355 |
| 3,033,251 | 5/1962 | Atkinson et al. | 83/835 |
| 3,477,479 | 11/1969 | Doty | 83/835 |
| 3,977,289 | 8/1976 | Tuke | 83/697 X |
| 4,188,952 | 2/1980 | Loschilov et al. | 30/355 X |

Primary Examiner—Kenneth E. Peterson
Attorney, Agent, or Firm—Moore & Hansen

[57] ABSTRACT

An improved saw blade for portable reciprocating power saws in which the end of the blade is curved to enable self starting of the blade while minimizing blade breakage.

2 Claims, 3 Drawing Sheets

5,517,889

SAW BLADE

This is a continuation of application Ser. No. 08/163,589 filed Dec. 6, 1993, now abandoned, which was in turn a continuation of application Ser. No. 07/920,651 filed Jul. 28, 1992, now abandoned.

FIELD OF THE INVENTION

The present invention relates to blades used in reciprocating power saws, specifically to blades of the self starting variety.

BACKGROUND OF THE INVENTION

With the introduction of portable hand held power saws of the reciprocating blade type sometimes known as sabre saws, jig saws, hack saws or Saws-All saws, one major problem in utilization was discovered. When starting a saw cut wholly within the material to be cut, a pilot hole had to be provided into which the blade could be inserted before the sawing could commence. This required additional tools and labor. With this inadequacy in mind several attempts have been made in the past to provide a blade with the ability to penetrate the material to be cut. One way is to use a blade with a rectilinear leading edge. The reciprocating action of the blade will try to pound its way through the material to be cut which causes excessive compression loading on the blade and subsequent blade breakage. Another blade designed to penetrate the material to be cut has all the teeth of a rake type and having the forward portion has a curvilinear form as in U.S. Pat. No. 3,477,480 by Doty. The combination of the raked teeth, the axial reciprocating motion and the large radius curvilinear shape prevents the teeth from cutting. When the blade is in the cutting position to penetrate the material to be cut and the saw is started, the forward motion of the blade presses the non-cutting side of the tooth against the material to be cut. The rearward or retraction portion of the cutting cycle pulls the blade teeth away from the material to be cut without penetrating or cutting the material.

OBJECTS AND ADVANTAGES

Accordingly, several objects of my invention are to provide a blade with true self starting properties through penetrating tooth profile, radiused shape of the penetrating portion of the blade and relationship between the blade length and width.

DESCRIPTION OF THE PREFERRED EMBODIMENT

Figure 1:
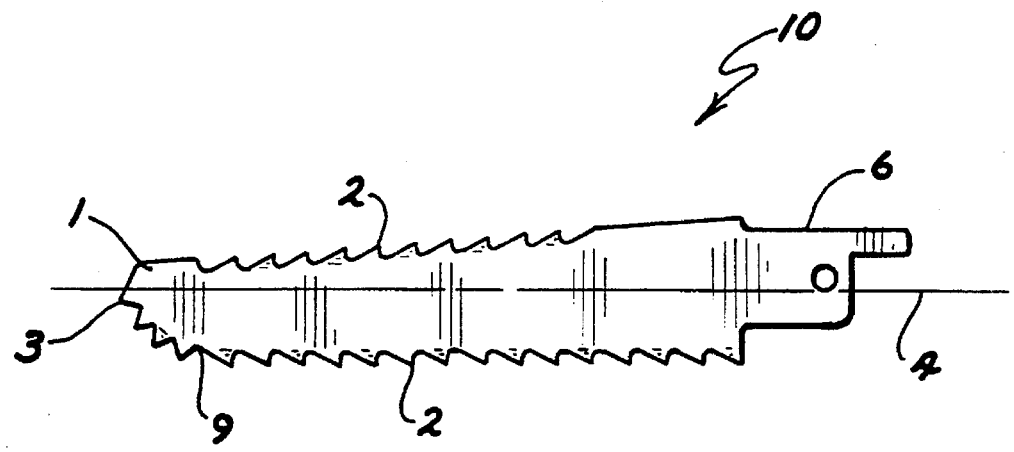
FIG. 1 is an elevated view of a typical blade with the preferred form of the present invention.

Referring now to the above mentioned drawings in which like reference characters designate like or corresponding parts throughout the several views, the device 10 in accordance with the present invention is illustrated in FIGS. 1–9. The device 10 is intended to be used with a reciprocating saw of the hand held type sometimes known as a sabre saw, hack saw, jig saw or a Saws-All saw.

The device 10 in FIG. 1 includes a first end portion 1 and a second end portion 6. Second end portion 6 is the attachment point to the power saw and is only shown for illustrative purposes. It is intended to represent the shank end of the device which is accepted by a conventional chuck or clamp of a sabre saw or other powered reciprocating saw.

Figure 6:
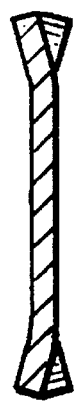
FIG. 6 is a section view of the saw blade taken along line 6—6 of FIG. 5.

The device 10 in FIG. 1 has either one side or two side edges formed with saw teeth given a rearward rake or a rake extending toward the shank or end portion of the body item 2 in FIGS. 1–5. This portion of the blade body has a rectilinear expanse from the point generally designated as 9 in FIG. 1 and extending to or near the shank end portion. This rectilinear edge section preferably forms a major portion of the overall length of the saw blade. As illustrated in FIG. 1, the device 10 also includes a longitudinal axis 4 extending along its length, generally bisecting the mass of the blade body, and also corresponding with the axis of motion of the device, as illustrated by the arrow in FIG. 3. The toothed form on the straight side edges 2 of the blade will have a conventional rearward raked profile to cut the material after the blade has penetrated the material to be cut. These raked teeth will be alternatly offset from each other, which is commonly known as set, as shown in FIG. 6.

Figure 4:
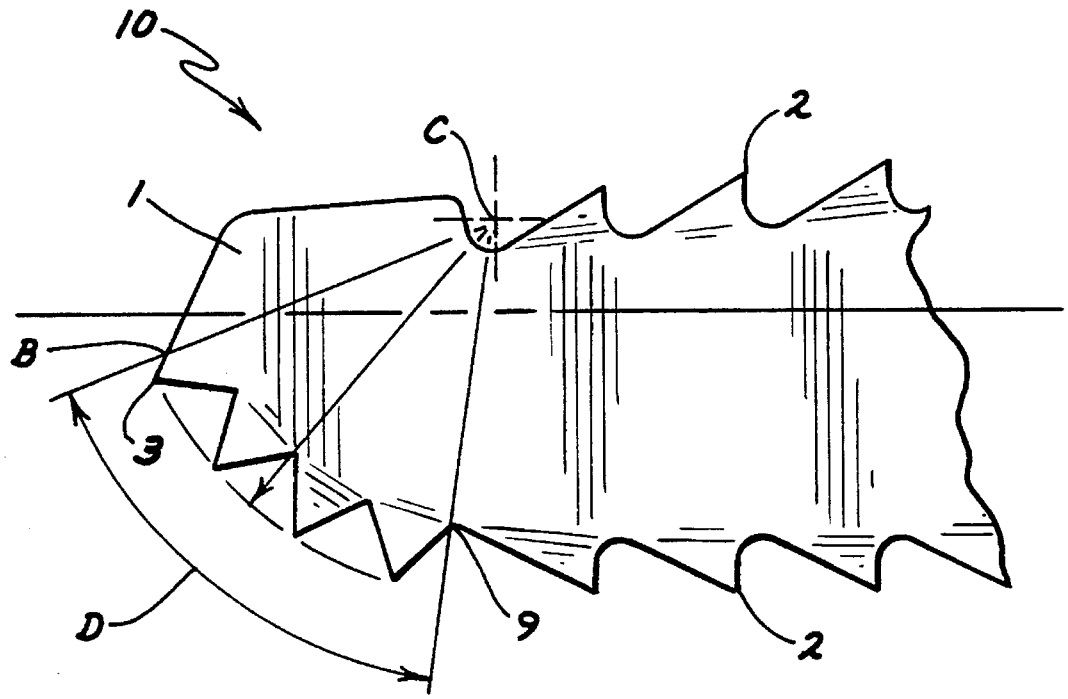
FIG. 4 is a side view of the radiused tip portion of a typical blade showing the relationship between blade width and the tip radius.
Figure 5:
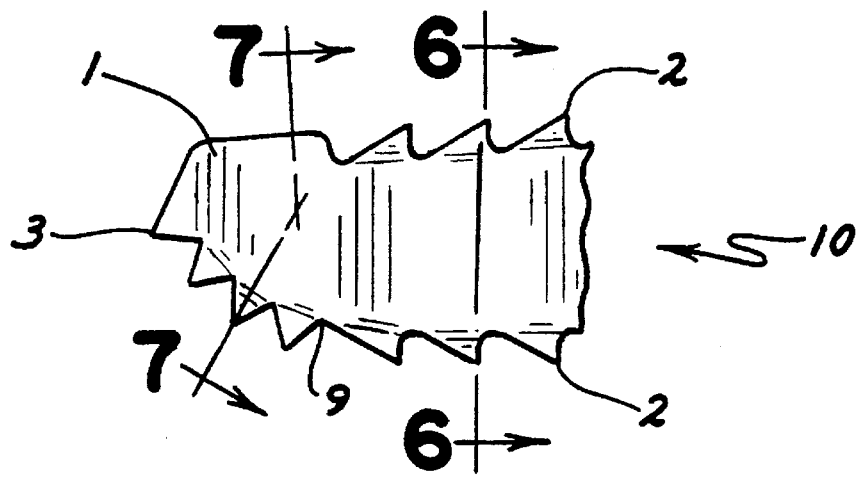
FIG. 5 is a side view of a typical blade illustrating the tooth profiles at the radiused tip portion of the blade and the straight shank cutting portion.

The tooth side edge or edges 2 of the blade body from the point 9 in FIGS. 1 & 4 to the forward end 3 FIGS. 1 & 4 has a curvilinear form and is struck about the center generally designated as C in FIG. 4 which is positioned inwardly of the extreme end of the blade body and to one side of the blade body. This curvature of the side edge between the end 3 and point 9 in FIGS. 1 & 4 is such that it is tangent to the rectilinear portion of the tooth edge 2. the curvature should be such as to avoid a sharp break or corner at 9 in FIG. 4.

It is preferable that the extreme forward end 3 in FIGS. 1 & 4 of the radiused toothed side of the blade have teeth extendant to the end. This helps to penetrate the material to be cut by removing the debris from the saw cut.

The practical curvature for the radius of the penetrating front portion of a blade approximately 3½" long is approximately ¾" struck about point C. FIG. 4. This curvature should be sufficiently large that the included angle D in FIG. 4 which is defined by a line drawn from point C in FIG. 4 to the intersection of the straight and curved portions of the saw blade teeth as generally designated as point 9 in FIG. 4 and the extreme forward end of the penetrating curved portion of the saw blade as point 8 in FIG. 4 is approximately 60 degrees.

Figure 9:
FIG. 9 is a detail side view of the raked teeth of the rectilinear segment of the blade body.

The preferred tooth form for the penetrating curved portion of the blade will have a triangular pointed profile as shown in FIG. 9. This tooth profile will cut material in both the extension and retraction motions of the cutting cycle.

Figure 2:
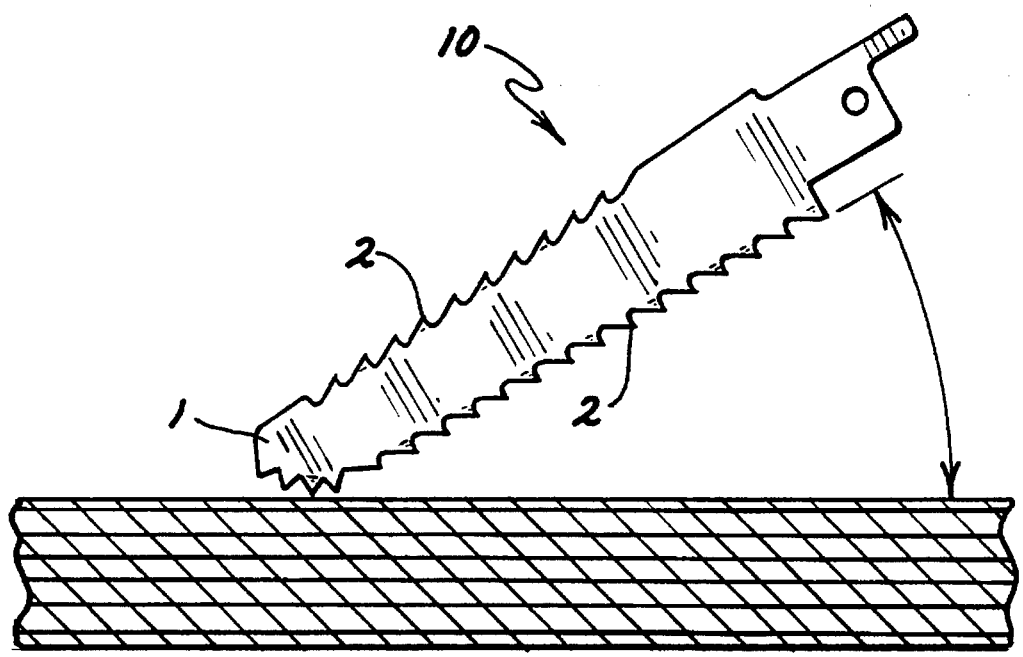
FIG. 2 is a diagram showing the manner in which blades made in accordance with the present invention are used to start a hole in the material being cut.
Figure 3:
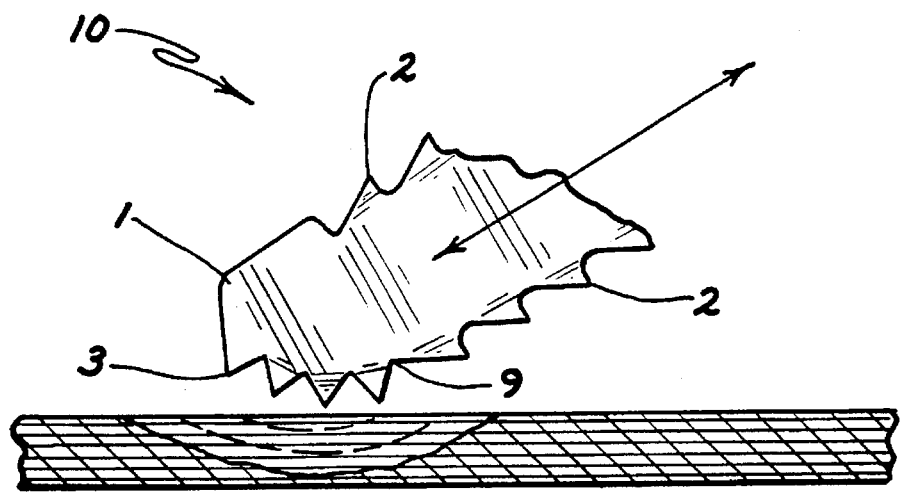
FIG. 3 is an enlarged diagram illustrating the action of the blade when starting the cut.
Figure 7:
FIG. 7 is a section view of the saw blade taken along line 7—7 of FIG. 5.
Figure 8:
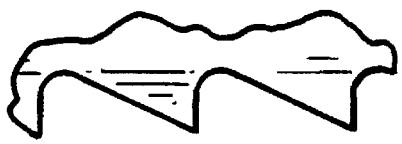
FIG. 8 is a detail side view of the generally isosceles triangular teeth of the forward end of the saw blade.

The shape of the saw tooth in the radiused portion of the blade has a triangular shape FIG. 9 as compared to the tooth shape in the straight rectilinear portion of the of the blade which has a raked tooth FIG. 9 with the point angled backward toward the shank end of the blade 6. This triangular shape of the tooth is preferable to enable the blade to penetrate the material to be cut. These triangular teeth will be alternatly offset from each other, which is commonly known as set, as shown in FIG. 7. This triangular shape will enable the blade to present a cutting edge of the tooth to the material to be cut during both the extension and retraction strokes of the reciprocating action of the saw as illustrated in FIG. 3 and positioned at about 30 degrees to the material to be cut as shown in FIG. 2.

Accordingly, the scope of the invention should be determined not only by the embodiment illustrated but by the appended claims and their legal equivalents.

Having thus described my invention and the manner in which it is used, I claim:

1. A self-starting saw blade for hand-held reciprocating power saws, comprising:

a blade body having a first end segment and a second end segment, a first edge and a second edge, and an elongate, rectilinear segment extending between said first and second end segments, said first edge of said first end segment of said blade body being curved toward said second edge of said first end segment, and said second end segment being engageable with the reciprocating saw;

a first set of teeth extending from said first edge of said first end segment of said blade body, each tooth of said first set of teeth having a configuration generally similar to an isosceles triangle, said first set of teeth projecting outwardly from said first end segment so that said teeth occupy less than ⅔ of a width of said blade at said first end segment;

a second set of teeth extending from said first edge of said rectilinear segment of said blade body, each tooth of said second set of teeth generally raked toward said second end segment of said blade body, and the points of said teeth of said second set of teeth are offset from the points of each adjacent said tooth, whereby the width of the saw cut is increased to prevent blade binding;

a third set of teeth extending from said second edge of said rectilinear segment of said blade body, each tooth of said third set of teeth generally raked toward said second end segment of said blade body, and the points of said teeth of said third set of teeth are offset from the points of each adjacent said tooth, whereby the width of the saw cut is increased to prevent blade binding; and said second edge of said first end segment maintains the rectilinear configuration of said rectilinear segment of said blade body.

2. The self-starting saw blade described in claim 1, wherein:

the points of said teeth of said first set of teeth are offset from the points of each adjacent said tooth, whereby the width of the saw cut is increased to prevent blade binding.

* * * * *